US009465191B2

(12) United States Patent
Guenter et al.

(10) Patent No.: US 9,465,191 B2
(45) Date of Patent: Oct. 11, 2016

(54) LENSES FOR CURVED SENSOR SYSTEMS

(71) Applicant: Microsoft Corporation, Redmond, WA (US)

(72) Inventors: Brian K. Guenter, Redmond, WA (US); Neil Emerton, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 349 days.

(21) Appl. No.: 13/924,423

(22) Filed: Jun. 21, 2013

(65) Prior Publication Data
US 2014/0376113 A1    Dec. 25, 2014

(51) Int. Cl.
| G02B 9/00 | (2006.01) |
| G02B 13/00 | (2006.01) |
| G02B 13/16 | (2006.01) |
| H04N 5/369 | (2011.01) |

(52) U.S. Cl.
CPC ............... *G02B 9/00* (2013.01); *G02B 13/003* (2013.01); *G02B 13/004* (2013.01); *G02B 13/0035* (2013.01); *G02B 13/16* (2013.01); *H04N 5/3696* (2013.01)

(58) Field of Classification Search
USPC .......................................... 359/754
See application file for complete search history.

(56) References Cited

U.S. PATENT DOCUMENTS

| 8,638,500 | B2 * | 1/2014 | Gallagher et al. ............ 359/642 |
| 2005/0219716 | A1 | 10/2005 | Koike |
| 2013/0003196 | A1 | 1/2013 | Guenter et al. |
| 2013/0063634 | A1 | 3/2013 | Yamano |
| 2013/0076900 | A1 | 3/2013 | Mrozek et al. |

FOREIGN PATENT DOCUMENTS

JP    2008-249909 A    10/2008

OTHER PUBLICATIONS

"International Search Report & Written Opinion for PCT Application No. PCT/US2014/042799", Mailed Date: Oct. 16, 2014, 12 pages.
"International Preliminary Report on Patentability Issued in PCT Application No. PCT/US2014/042799", Mailed Date: Sep. 2, 2015, 9 pages.

* cited by examiner

*Primary Examiner* — Jack Dinh
(74) *Attorney, Agent, or Firm* — Steve Wight; Sandy Swain; Micky Minhas

(57) ABSTRACT

The subject disclosure is directed towards lenses for curved surfaces, including multi-element lens assemblies. In one or more implementations, an object-side meniscus lens is coupled to an image/curved surface side subassembly including a biconvex lens. The subassembly may comprise a single biconvex lens or a biconvex lens coupled to a negative meniscus lens.

20 Claims, 14 Drawing Sheets

LENSES FOR CURVED SENSOR SYSTEMS

BACKGROUND

Contemporary lenses are designed/optimized to focus on a planar image surface. However, optical lens systems do not generally have their best focus on a planar imaging surface. For example, spherical lens systems tend to best focus on a roughly hemispherical surface, called the Petzval surface. Much of the complexity of lens design is in forcing the lens system to achieve best focus on a planar imaging surface, far away from the Petzval surface.

Developments in sensor technology have yielded somewhat low resolution curved sensors (with the resolution likely to increase in the future) that provide for improved quality of images. However, with such curved sensors, lenses optimized for planar image surfaces are inappropriate.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more of various aspects of the subject matter described herein are directed towards multi-element lens assemblies. One example implementation comprises a refractive object-side element having a positive object-facing surface, and one or more lenses optically coupled to the object-side element and configured to focus light onto a curved surface. Another example implementation comprises an object-side subassembly having overall positive refraction, and an image-side subassembly optically coupled to the object-side subassembly. The image-side subassembly is configured to receive light from the object-side subassembly and focus the received light onto a curved surface.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards multiple lens (multi-lens) assemblies configured to focus on a curved surface, such as a hemispherical or substantially hemispherical surface, e.g., a curved sensor. Two, three and four element multi-lens assemblies are exemplified herein, however it is understood that multi-lens assemblies having more than four elements, up to any practical number, are feasible. Further, wherever two or more lenses as shown as physically coupled, it is feasible to have a single lens ground, molded or otherwise manufactured as a single element provided that the materials were the same.

It should be understood that any of the examples herein are non-limiting. For instance, any of the refractive optical elements shown herein may be made of any suitable material, e.g., glass or plastic, and such materials may be used alone or in any combination in any lens assembly. Further, one or more reflective elements may be present instead of or in addition to refractive optical elements. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in lens technology in general.

Figure 1:
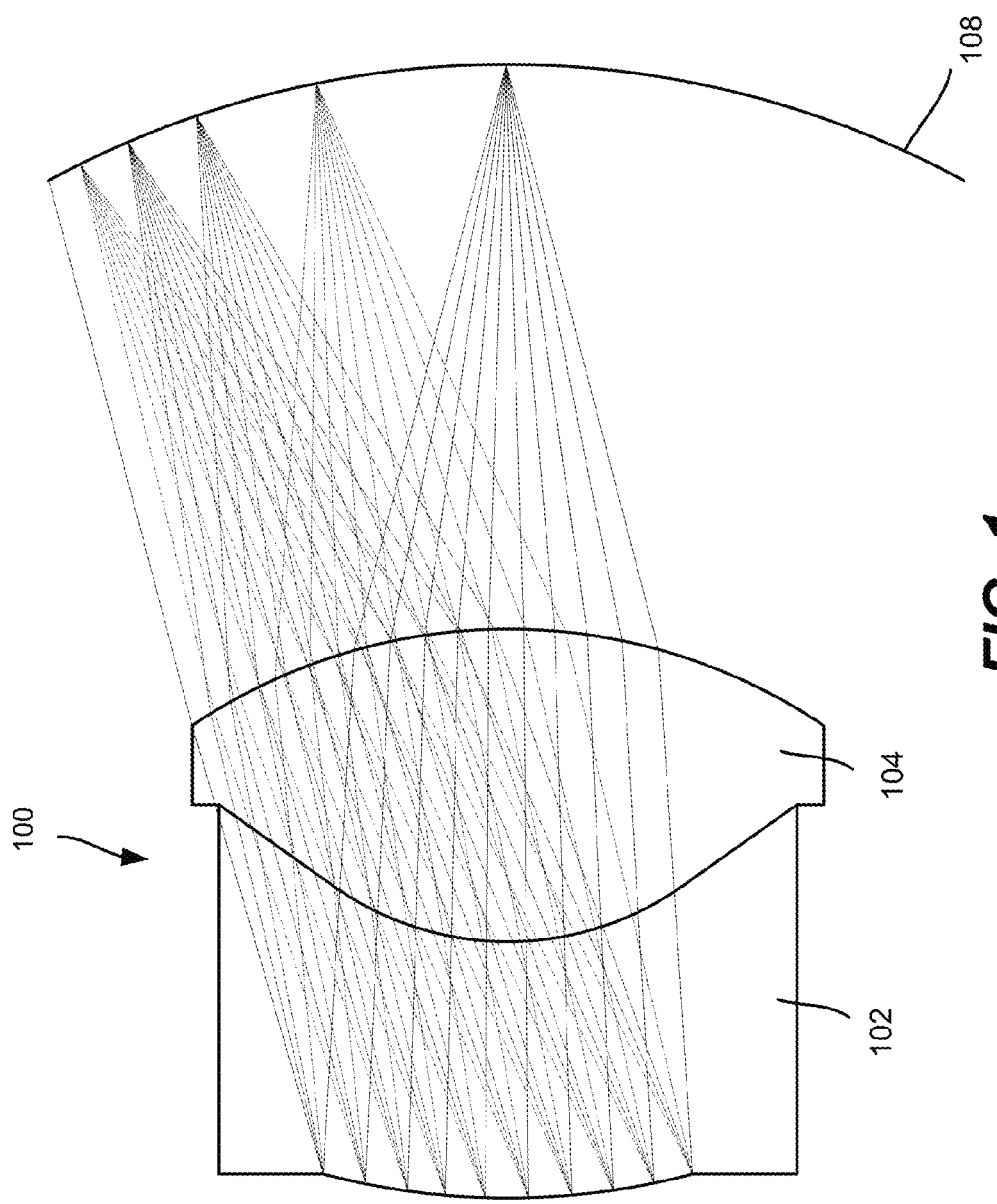
FIGS. 1-3 are representations of example two-element lens assemblies, each including an object-side positive meniscus lens and an image-side biconvex lens, according to one or more example implementations.

FIG. 1 shows an example two-element refractive optical element assembly 100 including a refractive optical element (e.g., a generally positive meniscus lens 102) having a positive refractive power from the object-to image direction via a convex-object side surface and concave opposite side. As generally represented in FIG. 1, the convex object-facing side of the lens 102 has a larger radius of curvature than the opposite image-facing concave side. Note that FIG. 1 is not intended to convey any actual sizes or dimensions.

The positive meniscus lens 102 is coupled to a generally biconvex lens 104 to focus light onto a curved surface 108. As can be seen in FIG. 1, the lens 104 is configured to receive light from the lens 102. The lens 104 has an object-facing side with a smaller radius of curvature than its image/curved surface-facing side.

The lenses 102 and 104 are shown as physically coupled, however it is understood that they may be separated by a suitable gap filled with any liquid or gas, including air. The lenses 102 and 104 may be made of plastic, glass, or one plastic, one glass, for example. The following show data of one example implementation corresponding to FIG. 1:

| Surf | Type | Radius | Thickness | Diameter | Conic |
|---|---|---|---|---|---|
| OBJ | STANDARD | Infinity | Infinity | 0 | 0 |
| STO | EVENASPH | 2.149059 | 1.143113 | 1.477866 | 0.3033693 |
| 2 | EVENASPH | 0.5794461 | 1.250096 | 2.454417 | −0.8047933 |
| 3 | EVENASPH | −2.715948 | 2.577189 | 2.676481 | −0.7515823 |
| IMA | STANDARD | −4.180481 | 4.085812 | −0.4251225 | IMA |

| Surface STO EVENASPH ||
|---|---|
| Coefficient on $r^2$ | −0.098497123 |
| Coefficient on $r^4$ | −0.040043231 |
| Coefficient on $r^6$ | 0.026768729 |
| Coefficient on $r^8$ | −0.061589691 |
| Coefficient on $r^{10}$ | 0.041752082 |
| Coefficient on $r^{12}$ | 0 |

-continued

| | |
|---|---|
| Coefficient on r^14 | 0 |
| Coefficient on r^16 | 0 |
| Surface 2 EVENASPH | |
| Coefficient on r^2 | −0.45158306 |
| Coefficient on r^4 | −0.014772696 |
| Coefficient on r^6 | −0.28951155 |
| Coefficient on r^8 | 0.19693689 |
| Coefficient on r^10 | −0.089640559 |
| Coefficient on r^12 | 0 |
| Coefficient on r^14 | 0 |
| Coefficient on r^16 | 0 |
| Surface 3 EVENASPH | |
| Coefficient on r^2 | −0.03789558 |
| Coefficient on r^4 | −0.0063094918 |
| Coefficient on r^6 | 0.0026530481 |
| Coefficient on r^8 | −0.0048491677 |
| Coefficient on r^10 | 0.0027909406 |
| Coefficient on r^12 | 0 |
| Coefficient on r^14 | 0 |
| Coefficient on r^16 | 0 |

Figure 2:
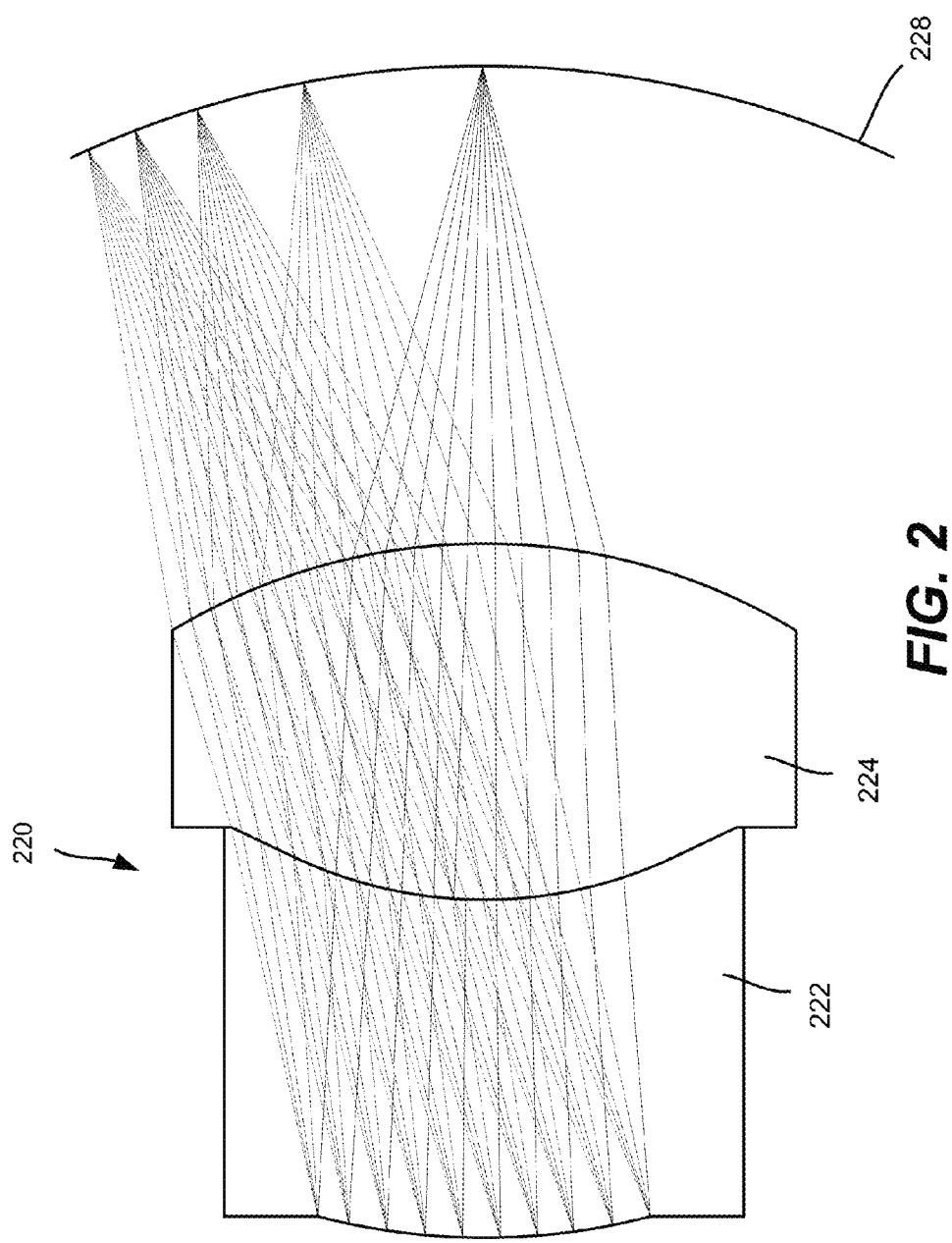

FIG. 2 is similar to FIG. 1, and thus shows a two-element assembly 200 having a positive meniscus lens 222 is coupled to a generally biconvex lens 224 to focus light onto a curved surface 228. Differences between FIG. 1 and FIG. 2 include the thicknesses of the lenses 222 and 224, as well as the ratio of each assembly's elements' thicknesses.

The following show data of one example implementation corresponding to FIG. 2:

| Surf | Type | Radius | Thickness | Diameter | Conic |
|---|---|---|---|---|---|
| OBJ | STANDARD | Infinity | Infinity | 0 | 0 |
| STO | EVENASPH | 6.432122 | 1.799185 | 1.79147 | 0 |
| 2 | EVENASPH | 4.164469 | 1.833238 | 2.654085 | 0. |
| 3 | EVENASPH | −5.779919 | 2.572927 | 3.290749 | 0 |
| IMA | STANDARD | −4.979109 | 4.4 | −0.1449482 | IMA |

| Surface STO EVENASPH | |
|---|---|
| Coefficient on r^2 | 0.016949412 |
| Coefficient on r^4 | −0.0060254369 |
| Coefficient on r^6 | 0.002018416 |
| Coefficient on r^8 | −0.003288917 |
| Coefficient on r^10 | 0.0013935683 |
| Coefficient on r^12 | 0 |
| Coefficient on r^14 | 0 |
| Coefficient on r^16 | 0 |
| Surface 2 EVENASPH | |
| Coefficient on r^2 | 0.10488576 |
| Coefficient on r^4 | 0.0080114777 |
| Coefficient on r^6 | −0.013581529 |
| Coefficient on r^8 | 0.0040498405 |
| Coefficient on r^10 | −0.00072005712 |
| Coefficient on r^12 | 0 |
| Coefficient on r^14 | 0 |
| Coefficient on r^16 | 0 |
| Surface 3 EVENASPH | |
| Coefficient on r^2 | −0.064406122 |
| Coefficient on r^4 | −0.0011588418 |
| Coefficient on r^6 | −0.00049122944 |
| Coefficient on r^8 | 0.00020124711 |
| Coefficient on r^10 | 2.7372079e−005 |
| Coefficient on r^12 | 0 |
| Coefficient on r^14 | 0 |
| Coefficient on r^16 | 0 |

Figure 3:
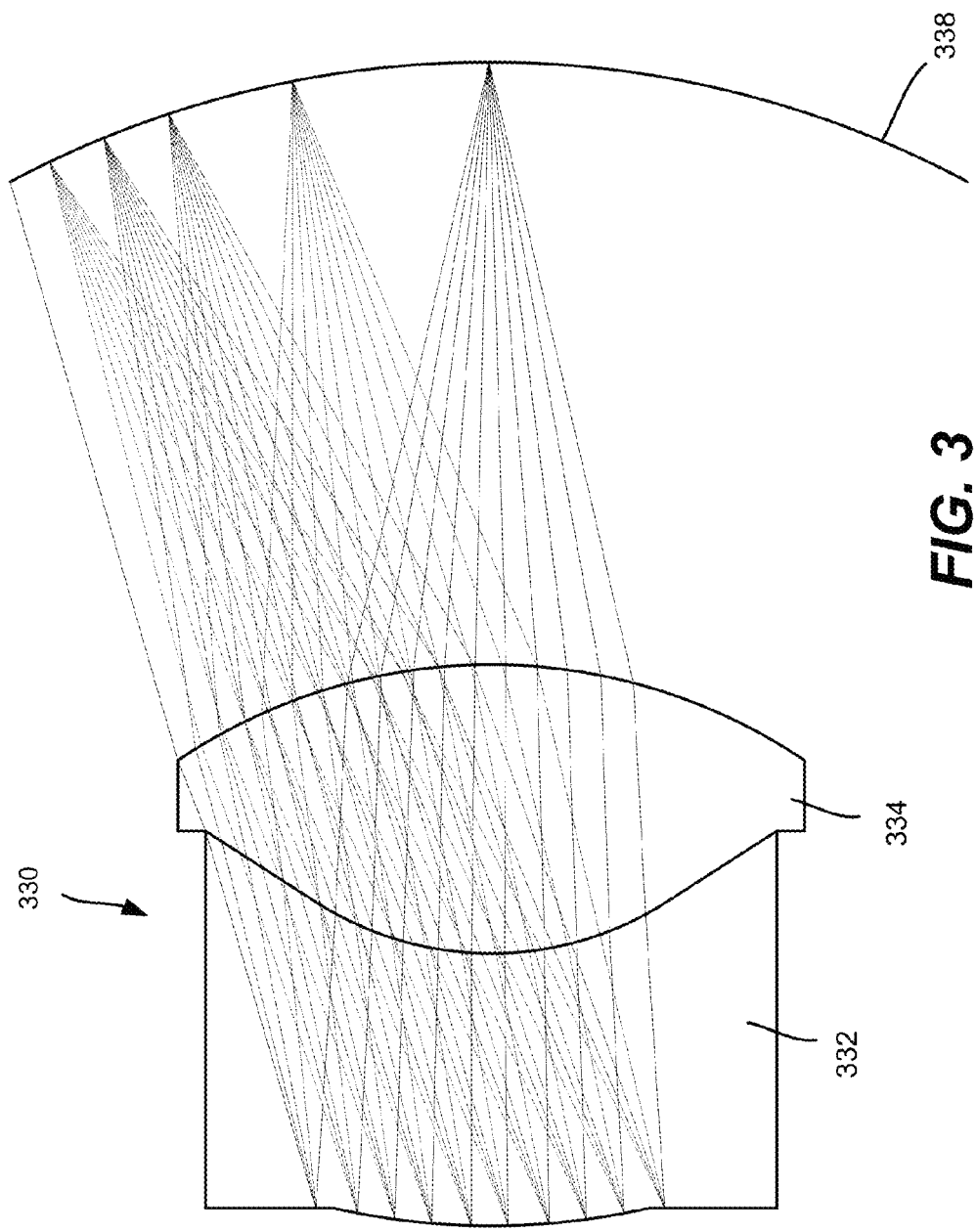

FIG. 3 is similar to FIGS. 1 and 2, having a two-element assembly 300 with a positive (object-side) meniscus lens 332 is coupled to a generally biconvex lens 334 to focus light onto a curved surface 338. The following show data of one example implementation corresponding to FIG. 3:

| Surf | Type | Radius | Thickness | Diameter | Conic |
|---|---|---|---|---|---|
| OBJ | STANDARD | Infinity | Infinity | 0 | 0 |
| STO | EVENASPH | 1.91288 | 1.110882 | 1.623566 | −0.1702735 |
| 2 | EVENASPH | 0.4475397 | 1.378157 | 2.557306 | −0.8949009 |
| 3 | EVENASPH | −2.76981 | 2.49896 | 2.797017 | −0.7235262 |
| IMA | STANDARD | −4.156886 | 4 | −0.4313463 | IMA |

| Surface STO EVENASPH | |
|---|---|
| Coefficient on r^2 | −0.11783356 |
| Coefficient on r^4 | −0.03550621 |
| Coefficient on r^6 | 0.02213866 |
| Coefficient on r^8 | −0.043313454 |
| Coefficient on r^10 | 0.024704316 |
| Coefficient on r^12 | 0 |
| Coefficient on r^14 | 0 |
| Coefficient on r^16 | 0 |
| Surface 2 EVENASPH | |
| Coefficient on r^2 | −0.7091958 |
| Coefficient on r^4 | 0.0034960593 |
| Coefficient on r^6 | −0.31902203 |
| Coefficient on r^8 | 0.1978099 |
| Coefficient on r^10 | −0.078643857 |
| Coefficient on r^12 | 0 |
| Coefficient on r^14 | 0 |
| Coefficient on r^16 | 0 |
| Surface 3 EVENASPH | |
| Coefficient on r^2 | −0.035138687 |
| Coefficient on r^4 | −0.0051648925 |
| Coefficient on r^6 | 0.0030843072 |
| Coefficient on r^8 | −0.0044482251 |
| Coefficient on r^10 | 0.002190287 |
| Coefficient on r^12 | 0 |
| Coefficient on r^14 | 0 |
| Coefficient on r^16 | 0 |

In the two-element design, in general there is a high negative conic constant, and hence large relative asphericity. Correction of coma and astigmatism may be done as with the three-element design as described below, and is generally based upon the surfaces remote from the stop and solving simultaneously for zero $S_{II}$ and $S_{III}$:

$$0 = S_{II} + \epsilon_2 \cdot S^*_{I2} + \epsilon_3 \cdot S^*_{I3}$$

$$0 = S_{III} + \epsilon_2^2 \cdot S^*_{I2} + \epsilon_3^2 \cdot S^*_{I3}$$

where $S_{II}$ and $S_{III}$ are the coma and astigmatism terms of the whole system before correction, respectively, $\epsilon_2$ and $\epsilon_3$ are the ratio of the principal and marginal ray heights at the second and third surfaces and $S_{I2}^*$ and $S_{I3}^*$ are the additional spherical aberration terms at the second and third surfaces.

Given the relative size of the Δn at those boundaries for optical materials used in the visible, it is apparent that the actual asphericity in terms of surface sag needs to be larger at surface two than at surface three.

Figure 4:
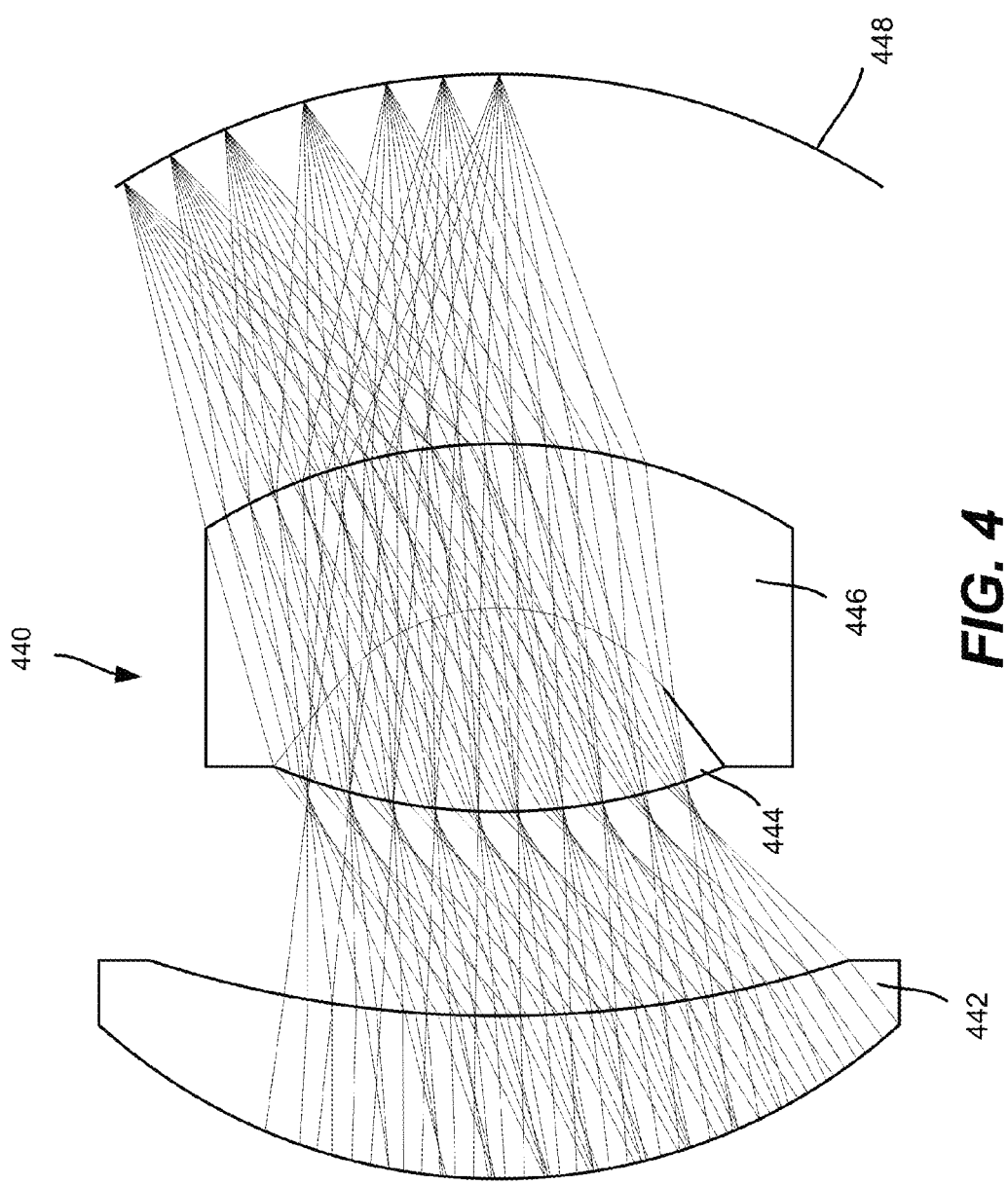
FIGS. 4-6 are representations of example three-element lens assemblies, each including an object-side meniscus lens and an image-side subassembly comprising a biconvex lens and negative meniscus lens, according to one or more example implementations.

FIG. 4 shows a three-element assembly 440 having an object-side positive, generally meniscus lens 442 optically coupled to a generally biconvex intermediate lens 444. In turn, the intermediate lens 444 is coupled (e.g., physically or at least optically) to a generally negative meniscus lens-shaped lens 446, which focuses light onto the curved surface 448.

Although as in FIGS. 1-3, no sizes or dimensions are intended to be conveyed in FIG. 4, although the relative radii of curvature of the individual elements and the gaps are such that the focal lengths are appropriate. The following show data of one example implementation corresponding to FIG. 4:

| Surf | Type | Radius | Thickness | Diameter | Conic |
|---|---|---|---|---|---|
| OBJ | STANDARD | Infinity | Infinity | 0 | 0 |
| STO | EVENASPH | 6.644491 | 0.9350005 | 4.586162 | 2.190639 |
| 2 | EVENASPH | 8.539573 | 1.159836 | 4.023222 | 10.7804 |
| 3 | EVENASPH | 4.935623 | 1.153228 | 2.607965 | −4.112604 |
| 4 | EVENASPH | −3.927883 | 0.9223948 | 2.604223 | −0.2457859 |
| 5 | EVENASPH | −4.481268 | 2.140144 | 3.366548 | −3.722884 |
| IMA | STANDARD | −4.128595 | 4.4 | 0.113461 | IMA |

Surface 1 EVENASPH

| | |
|---|---|
| Coefficient on r^2 | 0.067316768 |
| Coefficient on r^4 | 0.0013146276 |
| Coefficient on r^6 | 0.00035928207 |
| Coefficient on r^8 | −1.936854e−005 |
| Coefficient on r^10 | 0 |
| Coefficient on r^12 | 0 |
| Coefficient on r^14 | 0 |
| Coefficient on r^16 | 0 |

Surface 2 EVENASPH

| | |
|---|---|
| Coefficient on r^2 | 0.0017789485 |
| Coefficient on r^4 | 0.0013930933 |
| Coefficient on r^6 | 3.0658734e−005 |
| Coefficient on r^8 | −9.2314671e−005 |
| Coefficient on r^10 | 0 |
| Coefficient on r^12 | 0 |
| Coefficient on r^14 | 0 |
| Coefficient on r^16 | 0 |

Surface STO EVENASPH

| | |
|---|---|
| Coefficient on r^2 | 0.042529249 |
| Coefficient on r^4 | 0.00303047 |
| Coefficient on r^6 | 0.0044255189 |
| Coefficient on r^8 | −0.00060161924 |
| Coefficient on r^10 | 0 |
| Coefficient on r^12 | 0 |
| Coefficient on r^14 | 0 |
| Coefficient on r^16 | 0 |

Surface 4 EVENASPH

| | |
|---|---|
| Coefficient on r^2 | −0.36101226 |
| Coefficient on r^4 | −0.025921905 |
| Coefficient on r^6 | −0.0023854566 |
| Coefficient on r^8 | 0.0022634492 |
| Coefficient on r^10 | 0 |
| Coefficient on r^12 | 0 |
| Coefficient on r^14 | 0 |
| Coefficient on r^16 | 0 |

Surface 5 EVENASPH

| | |
|---|---|
| Coefficient on r^2 | −0.07956166 |
| Coefficient on r^4 | 0.0021746083 |
| Coefficient on r^6 | 6.0171164e−006 |
| Coefficient on r^8 | 0.00059107681 |
| Coefficient on r^10 | 0 |
| Coefficient on r^12 | 0 |
| Coefficient on r^14 | 0 |
| Coefficient on r^16 | 0 |

Figure 5:
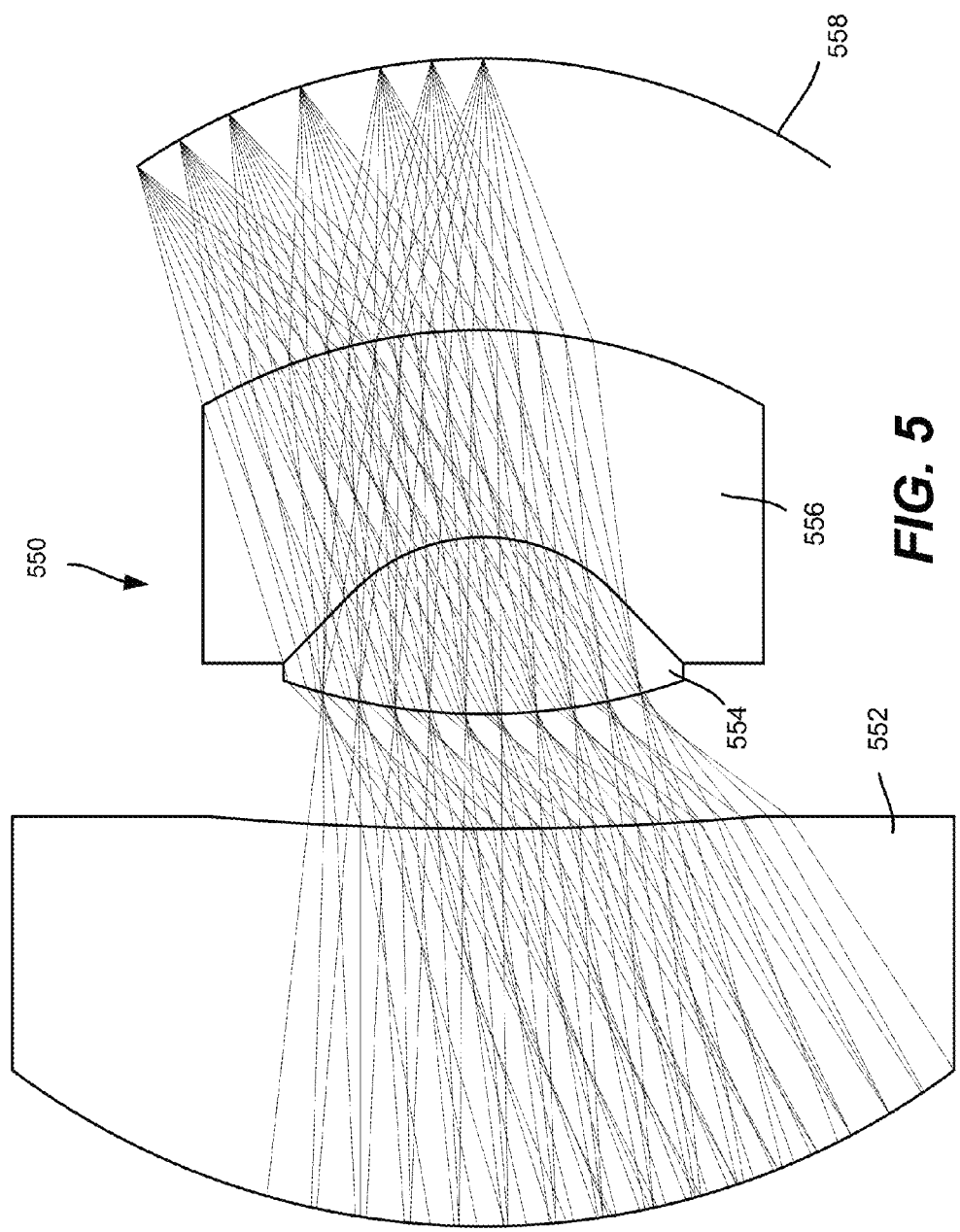

FIG. 5 shows an embodiment of another three-element assembly 550. The object-side lens 552 is close to plano-convex, but is still somewhat of a generally a positive meniscus lens. The biconvex lens 554 receives light from the object-side lens 552, and is shown as being physically coupled to a negative meniscus lens 556, which focuses the light onto the curved surface 558.

The following show data of one example implementation corresponding to FIG. 5:

| Surf | Type | Radius | Thickness | Diameter | Conic |
|---|---|---|---|---|---|
| OBJ | STANDARD | Infinity | Infinity | 0 | 0 |
| STO | EVENASPH | 10.04376 | 2.500336 | 5.938842 | −2.612775 |
| 2 | EVENASPH | 12.47944 | 0.7280293 | 3.826284 | 18.71383 |
| 3 | EVENASPH | 5.209887 | 1.091996 | 2.482273 | −1.745061 |
| 4 | EVENASPH | −2.867931 | 1.300414 | 2.532966 | −1.174326 |
| 5 | EVENASPH | −5.473922 | 1.711776 | 3.566488 | 4.812232 |
| IMA | STANDARD | −4.024843 | 4.4 | 0.457535 | IMA |

Surface 1 EVENASPH

| | |
|---|---|
| Coefficient on r^2 | 0.062615788 |
| Coefficient on r^4 | 0.00059644135 |
| Coefficient on r^6 | 9.8295376e−006 |
| Coefficient on r^8 | −9.0673164e−006 |
| Coefficient on r^10 | 0 |
| Coefficient on r^12 | 0 |
| Coefficient on r^14 | 0 |
| Coefficient on r^16 | 0 |

Surface 2 EVENASPH

| | |
|---|---|
| Coefficient on r^2 | −0.012678592 |
| Coefficient on r^4 | −0.00047655241 |
| Coefficient on r^6 | −0.00079881155 |
| Coefficient on r^8 | 5.0952505e−005 |
| Coefficient on r^10 | 0 |
| Coefficient on r^12 | 0 |
| Coefficient on r^14 | 0 |
| Coefficient on r^16 | 0 |

Surface STO EVENASPH

| | |
|---|---|
| Coefficient on r^2 | 0.036716283 |
| Coefficient on r^4 | 0.00017478943 |
| Coefficient on r^6 | 0.001604258 |
| Coefficient on r^8 | −0.00029375864 |
| Coefficient on r^10 | 0 |
| Coefficient on r^12 | 0 |
| Coefficient on r^14 | 0 |
| Coefficient on r^16 | 0 |

Surface 4 EVENASPH

| | |
|---|---|
| Coefficient on r^2 | −0.2496809 |
| Coefficient on r^4 | −0.04802043 |
| Coefficient on r^6 | −0.037620033 |
| Coefficient on r^8 | 0.023786848 |
| Coefficient on r^10 | 0 |
| Coefficient on r^12 | 0 |
| Coefficient on r^14 | 0 |
| Coefficient on r^16 | 0 |

Surface 5 EVENASPH

| | |
|---|---|
| Coefficient on r^2 | −0.071578632 |
| Coefficient on r^4 | 0.0054829717 |
| Coefficient on r^6 | 0.00016838389 |
| Coefficient on r^8 | 0.00044381629 |
| Coefficient on r^10 | 0 |
| Coefficient on r^12 | 0 |
| Coefficient on r^14 | 0 |
| Coefficient on r^16 | 0 |

Figure 6:
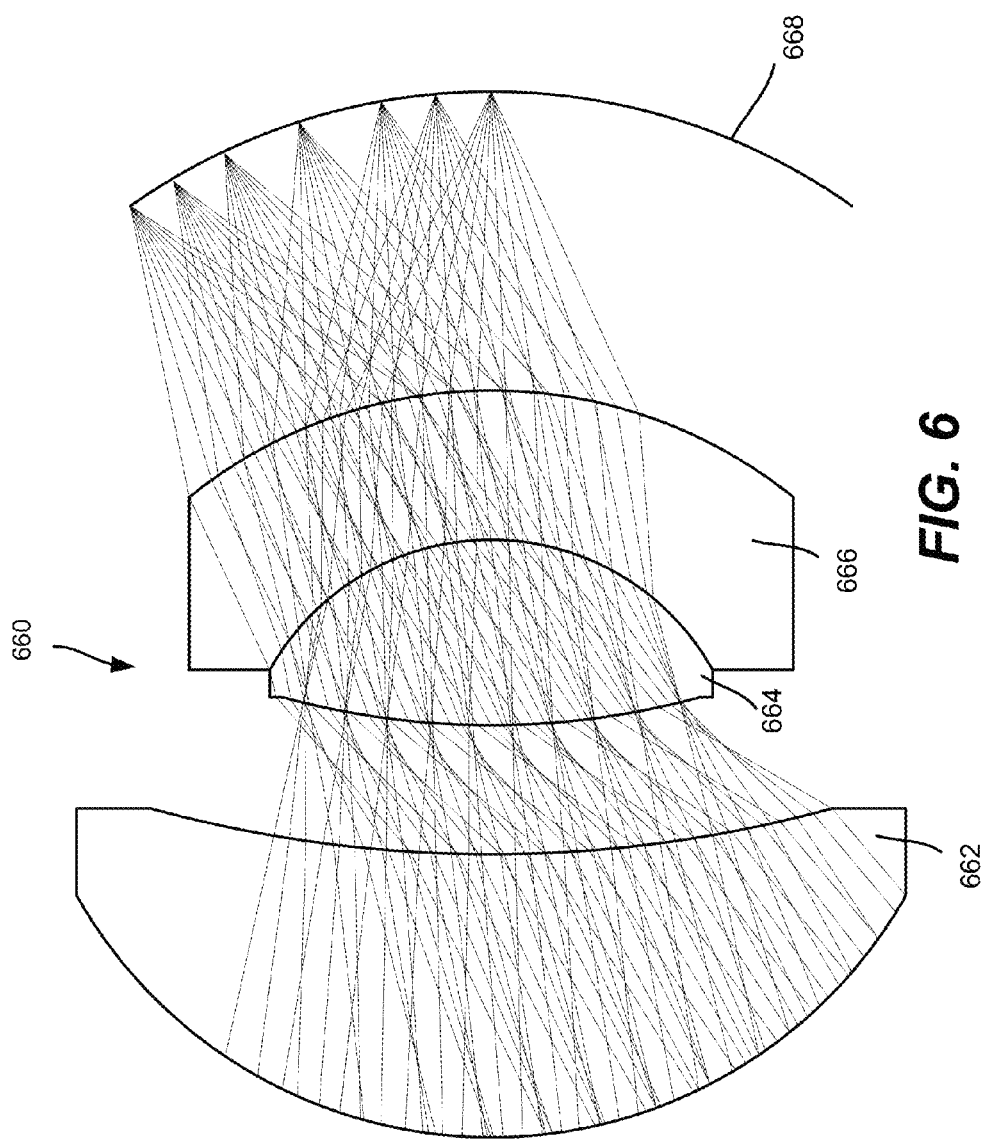

FIG. 6 shows an embodiment of another three-element assembly 660. The object-side lens 662 is a generally positive meniscus lens. A biconvex lens 664 receives light from the object-side lens 662, and is shown as being physically coupled to a negative meniscus lens 666, which focuses the light onto the curved surface 668.

The following show data of one example implementation corresponding to FIG. 6:

| Surf | Type | Radius | Thickness | Diameter | Conic |
|---|---|---|---|---|---|
| OBJ | STANDARD | Infinity | Infinity | 0 | 0 |
| STO | EVENASPH | 2.982782 | 1.579595 | 4.635227 | 0 |
| 2 | EVENASPH | 8.397587 | 0.6721739 | 3.783354 | 0 |

-continued

| | | | | | |
|---|---|---|---|---|---|
| 3 | EVENASPH | 3.775295 | 1.038479 | 2.383311 | 0 |
| 4 | EVENASPH | −1.307395 | 0.8361284 | 2.462342 | 0 |
| 5 | EVENASPH | −2.109334 | 1.640701 | 3.354517 | 0 |
| IMA | STANDARD | −3.623487 | 3.992889 | 0.2323074 | IMA |

Surface 1 EVENASPH

| | |
|---|---|
| Coefficient on $r^2$ | 0.026790834 |
| Coefficient on $r^4$ | 0.001466062 |
| Coefficient on $r^6$ | 0.00018799414 |
| Coefficient on $r^8$ | 1.1263726e−005 |
| Coefficient on $r^{10}$ | 0 |
| Coefficient on $r^{12}$ | 0 |
| Coefficient on $r^{14}$ | 0 |
| Coefficient on $r^{16}$ | 0 |

Surface 2 EVENASPH

| | |
|---|---|
| Coefficient on $r^2$ | −0.0075103766 |
| Coefficient on $r^4$ | 0.0044773476 |
| Coefficient on $r^6$ | −0.00096070056 |
| Coefficient on $r^8$ | 8.9569244e−005 |
| Coefficient on $r^{10}$ | 0 |
| Coefficient on $r^{12}$ | 0 |
| Coefficient on $r^{14}$ | 0 |
| Coefficient on $r^{16}$ | 0 |

Surface STO EVENASPH

| | |
|---|---|
| Coefficient on $r^2$ | −0.0082692559 |
| Coefficient on $r^4$ | −0.0035430794 |
| Coefficient on $r^6$ | −0.0047729108 |
| Coefficient on $r^8$ | 0.0037146523 |
| Coefficient on $r^{10}$ | 0 |
| Coefficient on $r^{12}$ | 0 |
| Coefficient on $r^{14}$ | 0 |
| Coefficient on $r^{16}$ | 0 |

Surface 4 EVENASPH

| | |
|---|---|
| Coefficient on $r^2$ | 0.012763776 |
| Coefficient on $r^4$ | 0.021906493 |
| Coefficient on $r^6$ | 0.0034661071 |
| Coefficient on $r^8$ | 0.010609723 |
| Coefficient on $r^{10}$ | 0 |
| Coefficient on $r^{12}$ | 0 |
| Coefficient on $r^{14}$ | 0 |
| Coefficient on $r^{16}$ | 0 |

Surface 5 EVENASPH

| | |
|---|---|
| Coefficient on $r^2$ | 0.046717901 |
| Coefficient on $r^4$ | 0.0094163635 |
| Coefficient on $r^6$ | 0.0016692686 |
| Coefficient on $r^8$ | −8.2571674e−005 |
| Coefficient on $r^{10}$ | 0 |
| Coefficient on $r^{12}$ | 0 |
| Coefficient on $r^{14}$ | 0 |
| Coefficient on $r^{16}$ | 0 |

FIGS. 7-13 are examples of four element lens assemblies. As can be seen, each of these example lens assemblies has a lens closet to the curved sensor that is a negative meniscus lens, (although in the examples of FIG. 12 and FIG. 13 the lenses are close to plano-concave). For purposes of brevity, rather than describe the individual lenses in each of the exemplified four-element lens assemblies, the data for each is provided.

Figure 7:
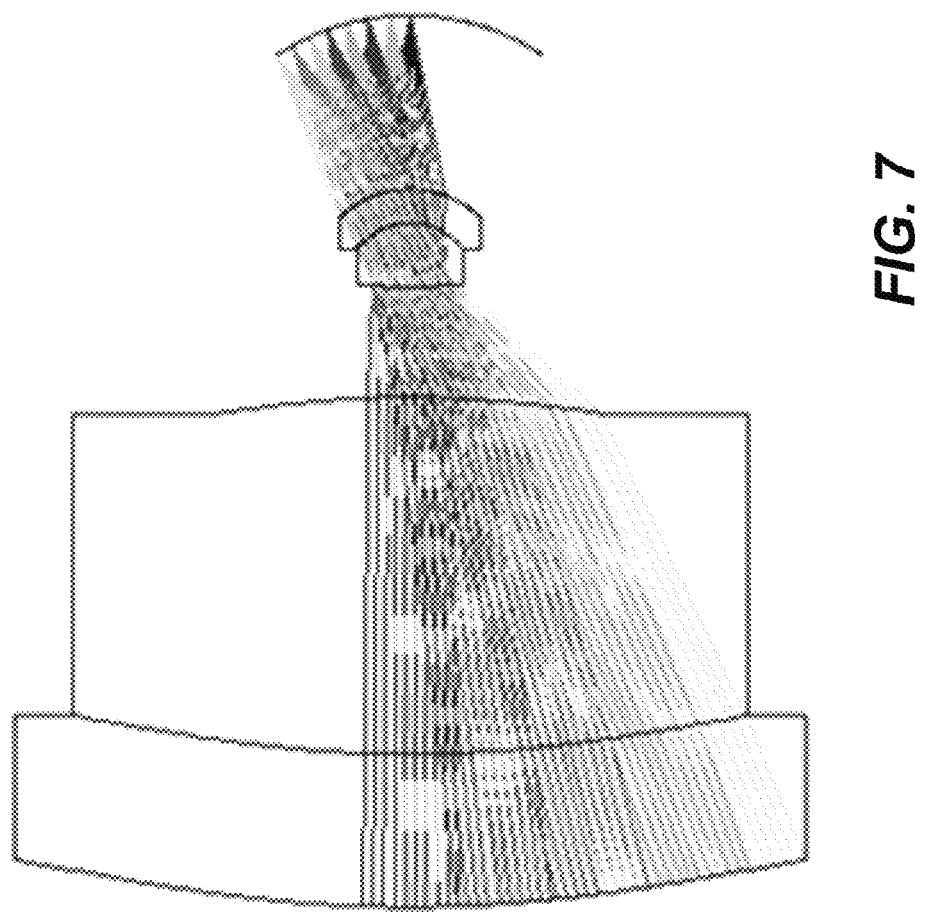
FIGS. 7-13 are representations of example four-element lens assemblies, each including an object-side positive refractive lens and an image-side negative refractive lens, according to one or more example implementations.

The following show data of one example implementation corresponding to FIG. 7:

| Surf | Type | Radius | Thickness | Diameter | Conic |
|---|---|---|---|---|---|
| OBJ | STANDARD | Infinity | Infinity | 0 | 0 |
| 1 | EVENASPH | 224.3738 | 18.41708 | 95.81648 | −11.33441 |
| 2 | EVENASPH | 273.4945 | 42.98881 | 81.69407 | 32.00641 |
| 3 | EVENASPH | −231.447 | 13.22963 | 47.1052 | −480.5678 |
| STO | EVENASPH | 81.19232 | 7.7093 | 11.33238 | −73.30876 |
| 5 | EVENASPH | −33.06094 | 4.035196 | 12.72217 | 17.45717 |
| 6 | EVENASPH | −27.76914 | 20.93704 | 17.26029 | 4.856911 |
| IMA | STANDARD | −29.79523 | 32 | 0.2489563 | IMA |

Surface 1 EVENASPH

| | |
|---|---|
| Coefficient on $r^2$ | 0.0009050068 |
| Coefficient on $r^4$ | −1.2866628e−007 |
| Coefficient on $r^6$ | −2.9977403e−011 |
| Coefficient on $r^8$ | −6.285853e−016 |
| Coefficient on $r^{10}$ | 0 |
| Coefficient on $r^{12}$ | 0 |
| Coefficient on $r^{14}$ | 0 |
| Coefficient on $r^{16}$ | 0 |

Surface 2 EVENASPH

| | |
|---|---|
| Coefficient on $r^2$ | 0.0016432507 |
| Coefficient on $r^4$ | −5.968454e−007 |
| Coefficient on $r^6$ | −5.8903375e−011 |
| Coefficient on $r^8$ | −2.4605836e−014 |
| Coefficient on $r^{10}$ | 0 |
| Coefficient on $r^{12}$ | 0 |
| Coefficient on $r^{14}$ | 0 |
| Coefficient on $r^{16}$ | 0 |

Surface 3 EVENASPH

| | |
|---|---|
| Coefficient on $r^2$ | −0.0027362957 |
| Coefficient on $r^4$ | 1.7252281e−006 |
| Coefficient on $r^6$ | −1.9753377e−009 |
| Coefficient on $r^8$ | 4.4952875e−013 |
| Coefficient on $r^{10}$ | 0 |
| Coefficient on $r^{12}$ | 0 |
| Coefficient on $r^{14}$ | 0 |
| Coefficient on $r^{16}$ | 0 |

-continued

| Surface STO EVENASPH | |
|---|---|
| Coefficient on r^2 | 0.0061035575 |
| Coefficient on r^4 | −1.1573733e−005 |
| Coefficient on r^6 | −3.8576759e−007 |
| Coefficient on r^8 | 3.8540073e−009 |
| Coefficient on r^10 | 0 |
| Coefficient on r^12 | 0 |
| Coefficient on r^14 | 0 |
| Coefficient on r^16 | 0 |

| Surface 5 EVENASPH | |
|---|---|
| Coefficient on r^2 | −0.048220655 |
| Coefficient on r^4 | −0.00017573318 |
| Coefficient on r^6 | −8.9580864e−007 |
| Coefficient on r^8 | −2.3634797e−009 |
| Coefficient on r^10 | 0 |
| Coefficient on r^12 | 0 |
| Coefficient on r^14 | 0 |
| Coefficient on r^16 | 0 |

| Surface 6 EVENASPH | |
|---|---|
| Coefficient on r^2 | −0.022321611 |
| Coefficient on r^4 | −2.5698424e−005 |
| Coefficient on r^6 | −1.2705637e−008 |
| Coefficient on r^8 | 5.0233863e−010 |
| Coefficient on r^10 | 0 |
| Coefficient on r^12 | 0 |
| Coefficient on r^14 | 0 |
| Coefficient on r^16 | 0 |

Figure 8:
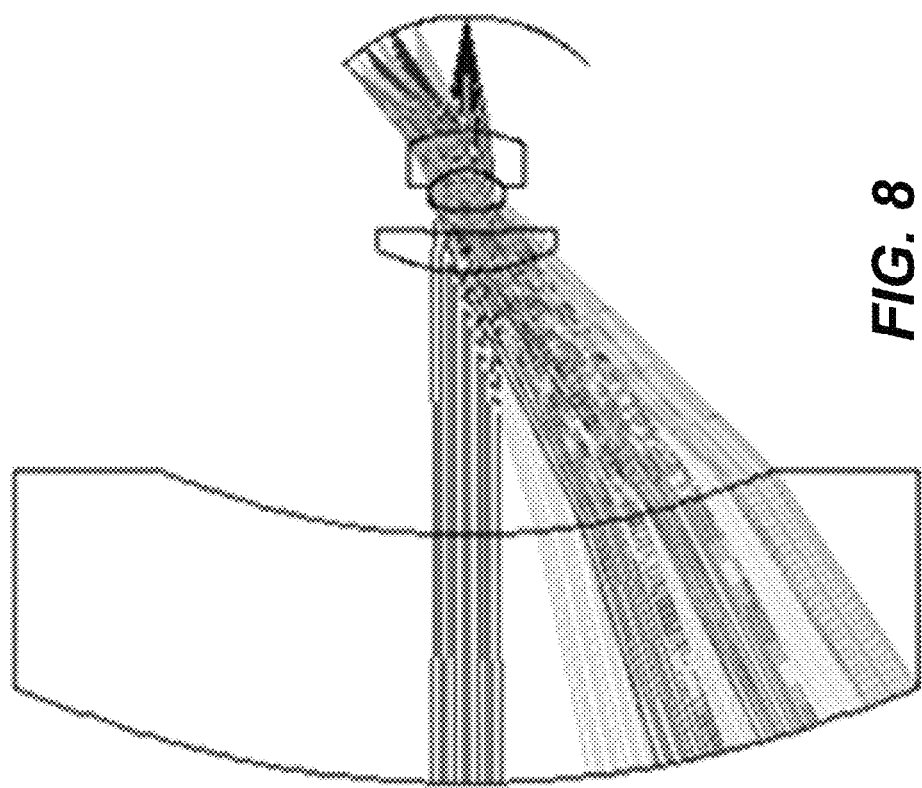

FIG. 8 example lens assembly details:

| Surf | Type | Radius | Thickness | Diameter | Conic |
|---|---|---|---|---|---|
| OBJ | STANDARD | Infinity | Infinity | 0 | 0 |
| 1 | EVENASPH | 162.123 | 32.50005 | 119.0927 | 3.010826 |
| 2 | EVENASPH | 129.3732 | 34.26242 | 81.72527 | 4.196508 |
| 3 | EVENASPH | 32.65833 | 5.173827 | 23.27261 | −2.239026 |
| 4 | EVENASPH | 51.06849 | 3.007101 | 19.19739 | −5.892531 |
| STO | EVENASPH | 31.85256 | 5.302895 | 10.03037 | 24.96704 |
| 6 | EVENASPH | −24.50952 | 4.964779 | 9.685754 | 20.14663 |
| 7 | EVENASPH | −27.137 | 14.95837 | 15.27177 | −6.28567 |
| IMA | STANDARD | −24.65858 | 32 | 0.3400413 | IMA |

| Surface 1 EVENASPH | |
|---|---|
| Coefficient on r^2 | 0.00026574669 |
| Coefficient on r^4 | 1.3090292e−007 |
| Coefficient on r^6 | −8.067507e−011 |
| Coefficient on r^8 | 3.2095808e−015 |
| Coefficient on r^10 | 0 |
| Coefficient on r^12 | 0 |
| Coefficient on r^14 | 0 |
| Coefficient on r^16 | 0 |

| Surface 2 EVENASPH | |
|---|---|
| Coefficient on r^2 | 0.00084216787 |
| Coefficient on r^4 | 6.1215846e−007 |
| Coefficient on r^6 | −5.3812441e−010 |
| Coefficient on r^8 | 3.5072263e−014 |
| Coefficient on r^10 | 0 |
| Coefficient on r^12 | 0 |
| Coefficient on r^14 | 0 |
| Coefficient on r^16 | 0 |

| Surface 3 EVENASPH | |
|---|---|
| Coefficient on r^2 | 0.0092935737 |
| Coefficient on r^4 | −5.5951183e−006 |
| Coefficient on r^6 | −7.2230948e−008 |
| Coefficient on r^8 | −7.3651341e−010 |
| Coefficient on r^10 | 0 |
| Coefficient on r^12 | 0 |
| Coefficient on r^14 | 0 |
| Coefficient on r^16 | 0 |

-continued

| Surface 4 EVENASPH | |
|---|---|
| Coefficient on r^2 | −0.0024420196 |
| Coefficient on r^4 | −2.2371721e−006 |
| Coefficient on r^6 | −8.2333791e−008 |
| Coefficient on r^8 | −4.4480187e−010 |
| Coefficient on r^10 | 0 |
| Coefficient on r^12 | 0 |
| Coefficient on r^14 | 0 |
| Coefficient on r^16 | 0 |

| Surface STO EVENASPH | |
|---|---|
| Coefficient on r^2 | 0.0097938162 |
| Coefficient on r^4 | −2.3705972e−006 |
| Coefficient on r^6 | 4.256789e−007 |
| Coefficient on r^8 | −1.4665789e−010 |
| Coefficient on r^10 | 0 |
| Coefficient on r^12 | 0 |
| Coefficient on r^14 | 0 |
| Coefficient on r^16 | 0 |

| Surface 6 EVENASPH | |
|---|---|
| Coefficient on r^2 | −0.073096589 |
| Coefficient on r^4 | 5.7190799e−005 |
| Coefficient on r^6 | 4.6297098e−007 |
| Coefficient on r^8 | −1.1106303e−009 |
| Coefficient on r^10 | 0 |
| Coefficient on r^12 | 0 |
| Coefficient on r^14 | 0 |
| Coefficient on r^16 | 0 |

| Surface 7 EVENASPH | |
|---|---|
| Coefficient on r^2 | −0.014538394 |
| Coefficient on r^4 | 4.4184008e−005 |
| Coefficient on r^6 | 3.8845346e−007 |
| Coefficient on r^8 | 3.6819816e−009 |
| Coefficient on r^10 | 0 |
| Coefficient on r^12 | 0 |
| Coefficient on r^14 | 0 |
| Coefficient on r^16 | 0 |

Figure 9:
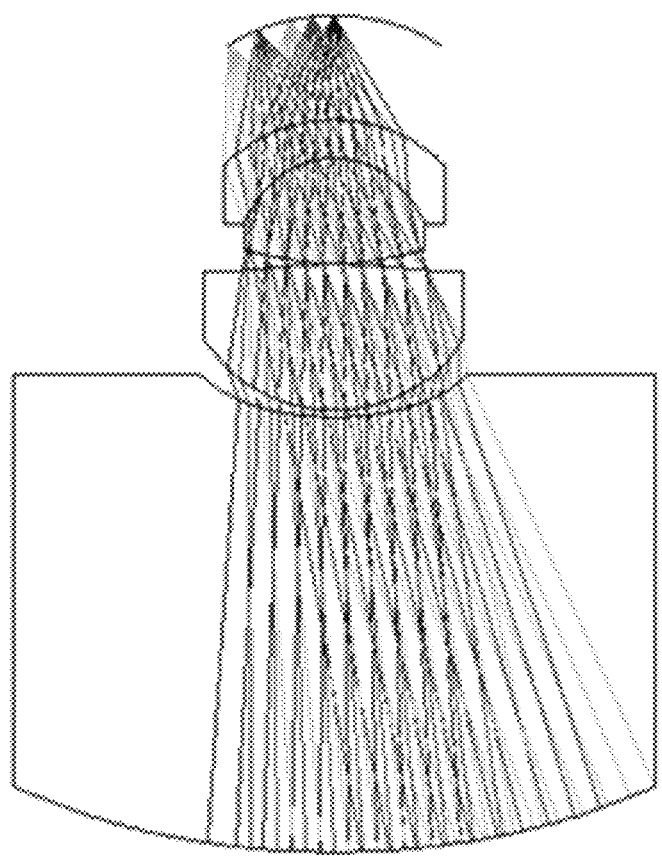

FIG. 9 example lens assembly details:

| Surf | Type | Radius | Thickness | Diameter | Conic |
|---|---|---|---|---|---|
| OBJ | STANDARD | Infinity | Infinity | 0 | 0 |
| 1 | EVENASPH | 62.96768 | 44.60342 | 66.41456 | 0.3010589 |
| 2 | EVENASPH | 31.11318 | 0.7130898 | 27.68156 | 1.258264 |
| 3 | EVENASPH | 24.76477 | 14.99275 | 26.88566 | 1.960634 |
| 4 | EVENASPH | 115.5418 | 0.1125 | 19.6447 | 107.2977 |
| STO | EVENASPH | 38.72699 | 10.74507 | 17.99032 | 10.32326 |
| 6 | EVENASPH | −17.98552 | 3.940343 | 18.76694 | 2.402588 |
| 7 | EVENASPH | −26.68607 | 10.7144 | 22.89597 | 2.670887 |
| IMA | STANDARD | −21.95436 | 21.99506 | 0.4361121 | IMA |

Surface 1 EVENASPH

| | |
|---|---|
| Coefficient on $r^2$ | −0.0027228227 |
| Coefficient on $r^4$ | 2.7447576e−007 |
| Coefficient on $r^6$ | −8.0962734e−011 |
| Coefficient on $r^8$ | −1.1754249e−013 |
| Coefficient on $r^{10}$ | 0 |
| Coefficient on $r^{12}$ | 0 |
| Coefficient on $r^{14}$ | 0 |
| Coefficient on $r^{16}$ | 0 |

Surface 2 EVENASPH

| | |
|---|---|
| Coefficient on $r^2$ | −0.00080108496 |
| Coefficient on $r^4$ | 1.7707049e−005 |
| Coefficient on $r^6$ | 1.2244301e−008 |
| Coefficient on $r^8$ | 1.5406142e−010 |
| Coefficient on $r^{10}$ | 0 |
| Coefficient on $r^{12}$ | 0 |
| Coefficient on $r^{14}$ | 0 |
| Coefficient on $r^{16}$ | 0 |

Surface 3 EVENASPH

| | |
|---|---|
| Coefficient on $r^2$ | 0.010033911 |
| Coefficient on $r^4$ | 9.1856009e−006 |
| Coefficient on $r^6$ | −7.4005883e−009 |
| Coefficient on $r^8$ | −2.3732676e−011 |
| Coefficient on $r^{10}$ | 0 |
| Coefficient on $r^{12}$ | 0 |
| Coefficient on $r^{14}$ | 0 |
| Coefficient on $r^{16}$ | 0 |

Surface 4 EVENASPH

| | |
|---|---|
| Coefficient on $r^2$ | −0.014248381 |
| Coefficient on $r^4$ | 2.4639797e−005 |
| Coefficient on $r^6$ | −3.0974358e−007 |
| Coefficient on $r^8$ | 2.1326118e−009 |
| Coefficient on $r^{10}$ | 0 |
| Coefficient on $r^{12}$ | 0 |
| Coefficient on $r^{14}$ | 0 |
| Coefficient on $r^{16}$ | 0 |

Surface STO EVENASPH

| | |
|---|---|
| Coefficient on $r^2$ | 0.0031486196 |
| Coefficient on $r^4$ | −6.719473e−006 |
| Coefficient on $r^6$ | −4.2952055e−007 |
| Coefficient on $r^8$ | 2.3378143e−010 |
| Coefficient on $r^{10}$ | 0 |
| Coefficient on $r^{12}$ | 0 |
| Coefficient on $r^{14}$ | 0 |
| Coefficient on $r^{16}$ | 0 |

Surface 6 EVENASPH

| | |
|---|---|
| Coefficient on $r^2$ | −0.024585082 |
| Coefficient on $r^4$ | −0.00015759285 |
| Coefficient on $r^6$ | 7.5876778e−007 |
| Coefficient on $r^8$ | −1.7075289e−009 |
| Coefficient on $r^{10}$ | 0 |
| Coefficient on $r^{12}$ | 0 |
| Coefficient on $r^{14}$ | 0 |
| Coefficient on $r^{16}$ | 0 |

Surface 7 EVENASPH

| | |
|---|---|
| Coefficient on $r^2$ | −0.012329076 |
| Coefficient on $r^4$ | −1.0162983e−005 |
| Coefficient on $r^6$ | 1.9008622e−007 |
| Coefficient on $r^8$ | −5.7975021e−010 |
| Coefficient on $r^{10}$ | 0 |

-continued

|  |  |
|---|---|
| Coefficient on r^12 | 0 |
| Coefficient on r^14 | 0 |
| Coefficient on r^16 | 0 |

Figure 10:
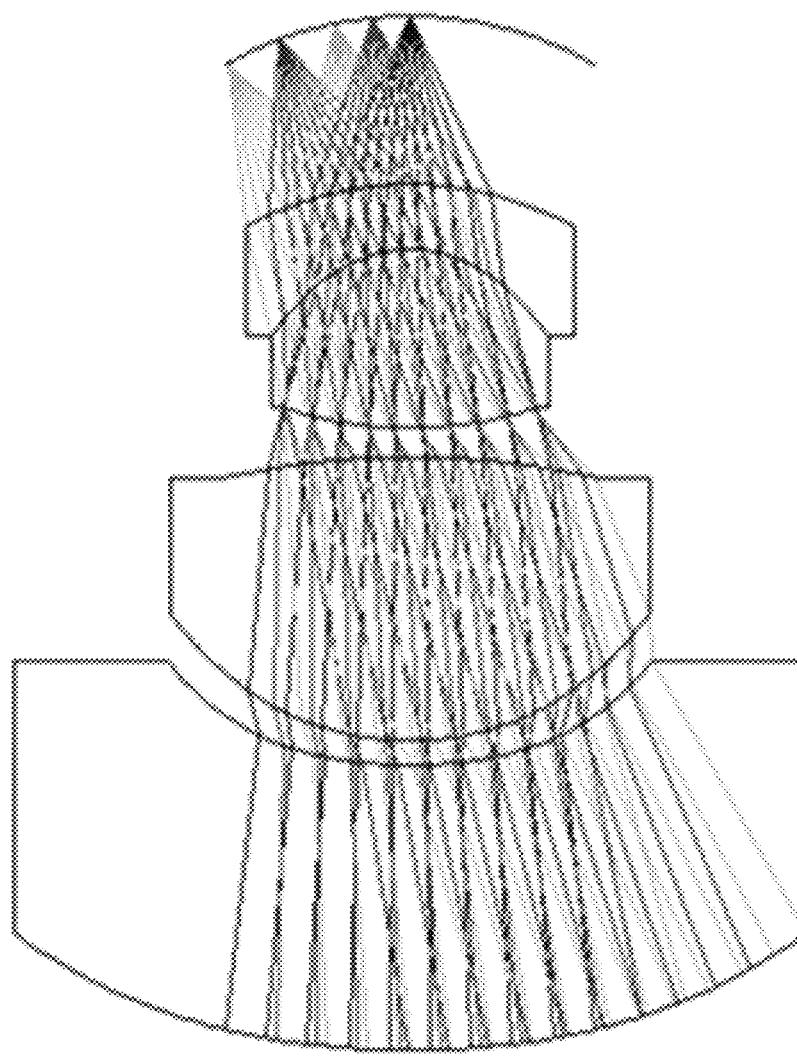

FIG. 10 example lens assembly details:

| Surf | Type | Radius | Thickness | Diameter | Conic |
|---|---|---|---|---|---|
| OBJ | STANDARD | Infinity | Infinity | 0 | 0 |
| 1 | EVENASPH | 15.48462 | 6.4366753 | 18.01328 | 0.7350255 |
| 2 | EVENASPH | 8.848879 | 0.55726 | 11.00158 | 1.003955 |
| 3 | EVENASPH | 9.032038 | 6.399996 | 10.93563 | 1.201861 |
| 4 | EVENASPH | 52.28122 | 0.6596292 | 8.418669 | −102.507 |
| STO | EVENASPH | 11.75226 | 4.029279 | 5.893034 | 7.760635 |
| 6 | EVENASPH | −5.062495 | 1.4752 | 6.311816 | 0.8644125 |
| 7 | EVENASPH | −9.769045 | 3.78492 | 7.504619 | 0.3084521 |
| IMA | STANDARD | −8.85309 | 8.334322 | 0.4148249 | IMA |

| Surface 1 EVENASPH | |
|---|---|
| Coefficient on r^2 | −0.0071907745 |
| Coefficient on r^4 | 3.5659214e−005 |
| Coefficient on r^6 | −6.2172173e−008 |
| Coefficient on r^8 | −4.0974779e−009 |
| Coefficient on r^10 | 0 |
| Coefficient on r^12 | 0 |
| Coefficient on r^14 | 0 |
| Coefficient on r^16 | 0 |

| Surface 2 EVENASPH | |
|---|---|
| Coefficient on r^2 | −0.0088366866 |
| Coefficient on r^4 | 0.00040564053 |
| Coefficient on r^6 | 9.3202089e−007 |
| Coefficient on r^8 | −1.0213473e−007 |
| Coefficient on r^10 | 0 |
| Coefficient on r^12 | 0 |
| Coefficient on r^14 | 0 |
| Coefficient on r^16 | 0 |

| Surface 3 EVENASPH | |
|---|---|
| Coefficient on r^2 | 0.017895107 |
| Coefficient on r^4 | 0.00040857664 |
| Coefficient on r^6 | −3.2173946e−006 |
| Coefficient on r^8 | −3.0588291e−007 |
| Coefficient on r^10 | 0 |
| Coefficient on r^12 | 0 |
| Coefficient on r^14 | 0 |
| Coefficient on r^16 | 0 |

| Surface 4 EVENASPH | |
|---|---|
| Coefficient on r^2 | −0.038343155 |
| Coefficient on r^4 | 0.00049343981 |
| Coefficient on r^6 | −2.6827802e−005 |
| Coefficient on r^8 | 7.0872313e−007 |
| Coefficient on r^10 | 0 |
| Coefficient on r^12 | 0 |
| Coefficient on r^14 | 0 |
| Coefficient on r^16 | 0 |

| Surface STO EVENASPH | |
|---|---|
| Coefficient on r^2 | 0.0057852056 |
| Coefficient on r^4 | 0.00020538583 |
| Coefficient on r^6 | −3.5523241e−005 |
| Coefficient on r^8 | −1.8504176e−007 |
| Coefficient on r^10 | 0 |
| Coefficient on r^12 | 0 |
| Coefficient on r^14 | 0 |
| Coefficient on r^16 | 0 |

| Surface 6 EVENASPH | |
|---|---|
| Coefficient on r^2 | −0.070725522 |
| Coefficient on r^4 | −0.001121991 |
| Coefficient on r^6 | 5.9885948e−005 |
| Coefficient on r^8 | 8.3858477e−006 |
| Coefficient on r^10 | 0 |
| Coefficient on r^12 | 0 |

-continued

| | |
|---|---|
| Coefficient on r^14 | 0 |
| Coefficient on r^16 | 0 |

Surface 7 EVENASPH

| | |
|---|---|
| Coefficient on r^2 | −0.019022298 |
| Coefficient on r^4 | 0.00011123481 |
| Coefficient on r^6 | 2.6657465e−005 |
| Coefficient on r^8 | −2.3693164e−007 |
| Coefficient on r^10 | 0 |
| Coefficient on r^12 | 0 |
| Coefficient on r^14 | 0 |
| Coefficient on r^16 | 0 |

Figure 11:
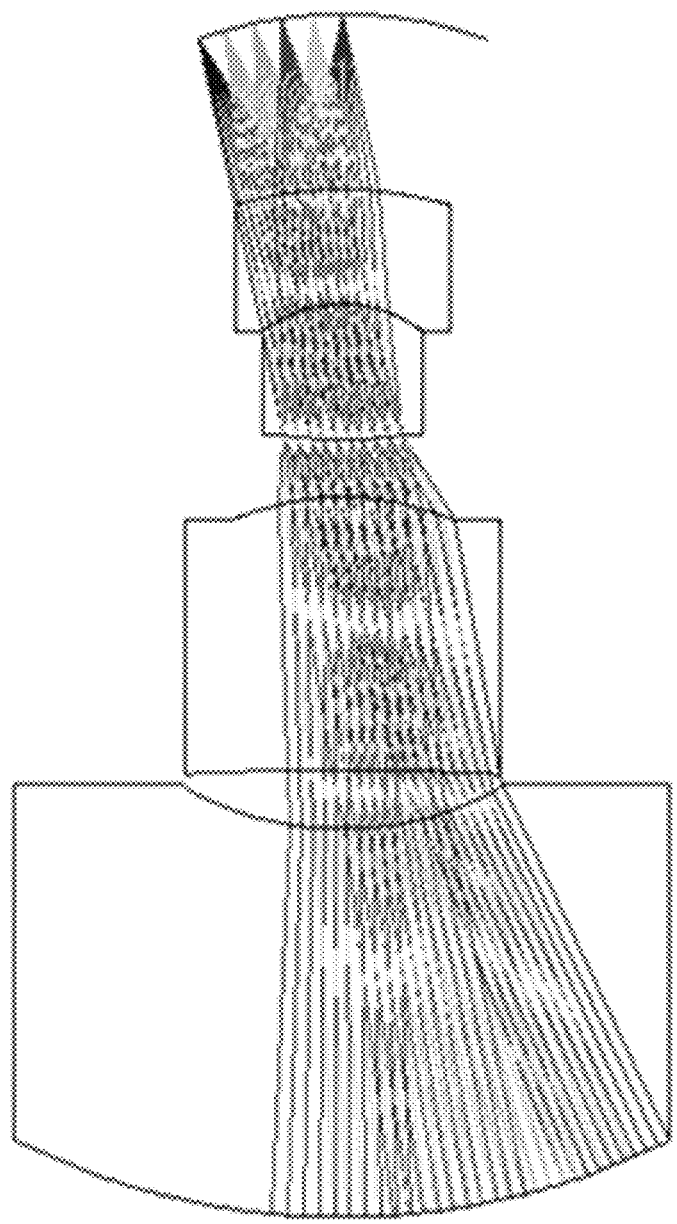

FIG. 11 example lens assembly details:

| Surf | Type | Radius | Thickness | Diameter | Conic |
|---|---|---|---|---|---|
| OBJ | STANDARD | Infinity | Infinity | 0 | 0 |
| 1 | EVENASPH | 34.46149 | 21.6879 | 36.8607 | 0 |
| 2 | EVENASPH | 22.25803 | 3.200012 | 18.05265 | 0 |
| 3 | EVENASPH | −43.37931 | 15.34823 | 17.64078 | 0 |
| 4 | EVENASPH | −15.71166 | 3.197076 | 12.67488 | 0 |
| STO | EVENASPH | 33.63017 | 7.563545 | 6.623186 | 0 |
| 6 | EVENASPH | −9.632602 | 6.408138 | 9.044731 | 0 |
| 7 | EVENASPH | −25.75564 | 9.774625 | 12.14408 | 0 |
| IMA | STANDARD | −24.33541 | 16.11549 | 0 | IMA |

Surface 1 EVENASPH

| | |
|---|---|
| Coefficient on r^2 | −0.0023330882 |
| Coefficient on r^4 | −2.0063176e−006 |
| Coefficient on r^6 | 1.712178e−009 |
| Coefficient on r^8 | −4.8168342e−012 |
| Coefficient on r^10 | 0 |
| Coefficient on r^12 | 0 |
| Coefficient on r^14 | 0 |
| Coefficient on r^16 | 0 |

Surface 2 EVENASPH

| | |
|---|---|
| Coefficient on r^2 | 0.0039164919 |
| Coefficient on r^4 | 8.2553246e−006 |
| Coefficient on r^6 | 2.4164262e−007 |
| Coefficient on r^8 | 3.8123788e−010 |
| Coefficient on r^10 | 0 |
| Coefficient on r^12 | 0 |
| Coefficient on r^14 | 0 |
| Coefficient on r^16 | 0 |

Surface 3 EVENASPH

| | |
|---|---|
| Coefficient on r^2 | 0.012882344 |
| Coefficient on r^4 | −5.6454175e−005 |
| Coefficient on r^6 | 3.7235058e−007 |
| Coefficient on r^8 | −2.5203063e−009 |
| Coefficient on r^10 | 0 |
| Coefficient on r^12 | 0 |
| Coefficient on r^14 | 0 |
| Coefficient on r^16 | 0 |

-continued

Surface 4 EVENASPH

| | |
|---|---|
| Coefficient on r^2 | −0.0052614684 |
| Coefficient on r^4 | 0.0001875086 |
| Coefficient on r^6 | −2.2633249e−006 |
| Coefficient on r^8 | 1.5881566e−008 |
| Coefficient on r^10 | 0 |
| Coefficient on r^12 | 0 |
| Coefficient on r^14 | 0 |
| Coefficient on r^16 | 0 |

Surface STO EVENASPH

| | |
|---|---|
| Coefficient on r^2 | 0.0034148683 |
| Coefficient on r^4 | 0.00026669857 |
| Coefficient on r^6 | −4.7164879e−006 |
| Coefficient on r^8 | 8.4829314e−008 |
| Coefficient on r^10 | 0 |
| Coefficient on r^12 | 0 |
| Coefficient on r^14 | 0 |
| Coefficient on r^16 | 0 |

Surface 6 EVENASPH

| | |
|---|---|
| Coefficient on r^2 | −0.016533876 |
| Coefficient on r^4 | −0.00028941833 |
| Coefficient on r^6 | −1.0187295e−005 |
| Coefficient on r^8 | 9.2891838e−007 |
| Coefficient on r^10 | 0 |
| Coefficient on r^12 | 0 |
| Coefficient on r^14 | 0 |
| Coefficient on r^16 | 0 |

Surface 7 EVENASPH

| | |
|---|---|
| Coefficient on r^2 | −0.0062723283 |
| Coefficient on r^4 | 4.010936e−005 |
| Coefficient on r^6 | 6.2071785e−007 |
| Coefficient on r^8 | 1.0114067e−008 |
| Coefficient on r^10 | 0 |
| Coefficient on r^12 | 0 |
| Coefficient on r^14 | 0 |
| Coefficient on r^16 | 0 |

Figure 12:
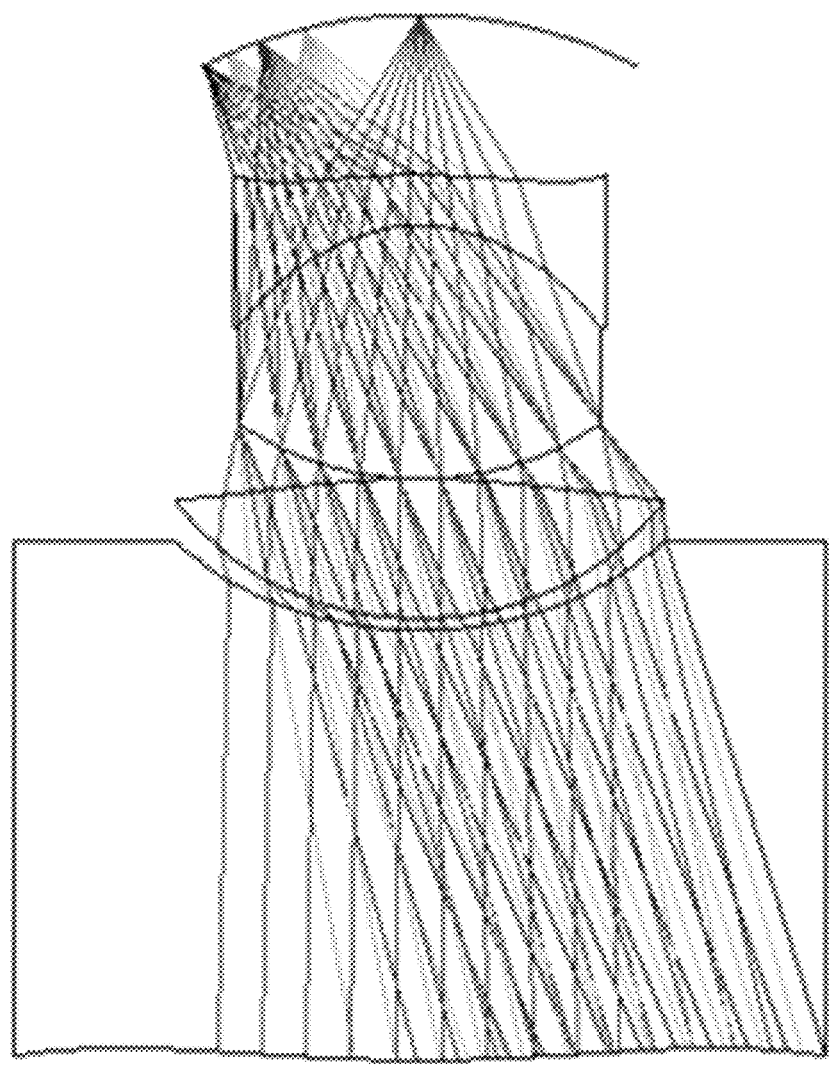

FIG. 12 example lens assembly details:

| Surf | Type | Radius | Thickness | Diameter | Conic |
|---|---|---|---|---|---|
| OBJ | STANDARD | Infinity | Infinity | 0 | 0 |
| 1 | EVENASPH | 7.057435 | 2.988707 | 5.674679 | 1.814324 |
| 2 | EVENASPH | 3.258223 | 0.08128771 | 3.426519 | −0.5657294 |
| 3 | EVENASPH | 2.901909 | 0.9694701 | 3.392434 | 0.05291388 |
| 4 | EVENASPH | −31.11675 | 0 | 3.368211 | 0 |
| STO | EVENASPH | 2.944861 | 1.764741 | 2.528473 | −0.3409325 |
| 6 | EVENASPH | −1.574102 | 0.3459662 | 2.519126 | −1.902648 |
| 7 | EVENASPH | −5.186811 | 1.116115 | 2.59444 | −28.09088 |
| IMA | STANDARD | −3.470872 | 3.036393 | 0.2865449 | IMA |

Surface 1 EVENASPH

| | |
|---|---|
| Coefficient on r^2 | −0.032551323 |
| Coefficient on r^4 | −0.0048517168 |

-continued

| | |
|---|---|
| Coefficient on r^6 | −0.00019793491 |
| Coefficient on r^8 | 1.3280715e−005 |
| Coefficient on r^10 | 0 |
| Coefficient on r^12 | 0 |
| Coefficient on r^14 | 0 |
| Coefficient on r^16 | 0 |
| Surface 2 EVENASPH | |
| Coefficient on r^2 | 0.028308733 |
| Coefficient on r^4 | −0.002587907 |
| Coefficient on r^6 | 0.0076772372 |
| Coefficient on r^8 | −0.0013908962 |
| Coefficient on r^10 | 0 |
| Coefficient on r^12 | 0 |
| Coefficient on r^14 | 0 |
| Coefficient on r^16 | 0 |
| Surface 3 EVENASPH | |
| Coefficient on r^2 | 0.052136909 |
| Coefficient on r^4 | −0.0025480509 |
| Coefficient on r^6 | 0.0063986009 |
| Coefficient on r^8 | −0.00051891927 |
| Coefficient on r^10 | 0 |
| Coefficient on r^12 | 0 |
| Coefficient on r^14 | 0 |
| Coefficient on r^16 | 0 |
| Surface 4 EVENASPH | |
| Coefficient on r^2 | −0.055267632 |
| Coefficient on r^4 | 0.0010476998 |
| Coefficient on r^6 | 0.0031384482 |
| Coefficient on r^8 | −0.00032573638 |
| Coefficient on r^10 | 0 |
| Coefficient on r^12 | 0 |
| Coefficient on r^14 | 0 |
| Coefficient on r^16 | 0 |
| Surface STO EVENASPH | |
| Coefficient on r^2 | 0.052303764 |
| Coefficient on r^4 | 0.0013254458 |
| Coefficient on r^6 | 0.011041063 |
| Coefficient on r^8 | −0.0042722676 |
| Coefficient on r^10 | 0 |
| Coefficient on r^12 | 0 |
| Coefficient on r^14 | 0 |
| Coefficient on r^16 | 0 |
| Surface 6 EVENASPH | |
| Coefficient on r^2 | −0.12060363 |
| Coefficient on r^4 | 0.032302384 |
| Coefficient on r^6 | −0.032302727 |
| Coefficient on r^8 | −0.0035113698 |
| Coefficient on r^10 | 0 |
| Coefficient on r^12 | 0 |
| Coefficient on r^14 | 0 |
| Coefficient on r^16 | 0 |
| Surface 7 EVENASPH | |
| Coefficient on r^2 | 0.015231714 |
| Coefficient on r^4 | 0.012736379 |
| Coefficient on r^6 | 0.005512558 |
| Coefficient on r^8 | 0.0040815702 |
| Coefficient on r^10 | 0 |
| Coefficient on r^12 | 0 |
| Coefficient on r^14 | 0 |
| Coefficient on r^16 | 0 |

Figure 13:
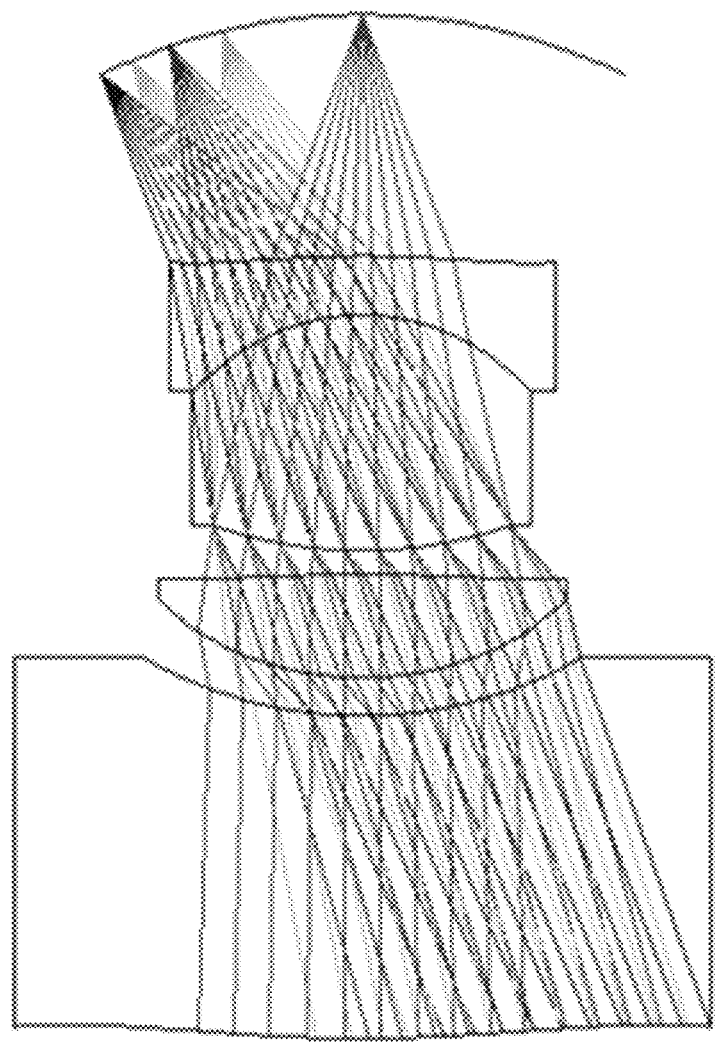

FIG. 13 example lens assembly details:

| Surf | Type | Radius | Thickness | Diameter | Conic |
|---|---|---|---|---|---|
| OBJ | STANDARD | Infinity | Infinity | 0 | 0 |
| 1 | EVENASPH | 5.859769 | 1.839874 | 3.996322 | −0.0417652 |
| 2 | EVENASPH | 2.831865 | 0.2170869 | 2.506635 | −0.5090163 |
| 3 | EVENASPH | 2.306807 | 0.5873021 | 2.334853 | 0.5058974 |
| 4 | EVENASPH | 80.21697 | 0.1369206 | 2.228267 | 4182.971 |

-continued

| | | | | | |
|---|---|---|---|---|---|
| STO | EVENASPH | 3.152057 | 1.341948 | 1.701928 | −1.099714 |
| 6 | EVENASPH | −1.410627 | 0.3361722 | 1.949082 | −1.114667 |
| 7 | EVENASPH | −4.960287 | 1.375117 | 2.223864 | −21.00731 |
| IMA | STANDARD | −3.508075 | 3.001053 | 0 | IMA |

| Surface 1 EVENASPH | |
|---|---|
| Coefficient on $r^2$ | −0.02899649 |
| Coefficient on $r^4$ | −0.010051793 |
| Coefficient on $r^6$ | −0.00048326198 |
| Coefficient on $r^8$ | 9.7659737e−005 |
| Coefficient on $r^{10}$ | 0 |
| Coefficient on $r^{12}$ | 0 |
| Coefficient on $r^{14}$ | 0 |
| Coefficient on $r^{16}$ | 0 |
| Surface 2 EVENASPH | |
| Coefficient on $r^2$ | 0.024143729 |
| Coefficient on $r^4$ | −0.00055718234 |
| Coefficient on $r^6$ | 0.0058160331 |
| Coefficient on $r^8$ | −0.0023649112 |
| Coefficient on $r^{10}$ | 0 |
| Coefficient on $r^{12}$ | 0 |
| Coefficient on $r^{14}$ | 0 |
| Coefficient on $r^{16}$ | 0 |
| Surface 3 EVENASPH | |
| Coefficient on $r^2$ | 0.049071226 |
| Coefficient on $r^4$ | 0.0097786873 |
| Coefficient on $r^6$ | 0.0089052798 |
| Coefficient on $r^8$ | 0.0023761706 |
| Coefficient on $r^{10}$ | 0 |
| Coefficient on $r^{12}$ | 0 |
| Coefficient on $r^{14}$ | 0 |
| Coefficient on $r^{16}$ | 0 |
| Surface 4 EVENASPH | |
| Coefficient on $r^2$ | −0.050967198 |
| Coefficient on $r^4$ | 0.0062549297 |
| Coefficient on $r^6$ | 0.013279928 |
| Coefficient on $r^8$ | −0.0047169231 |
| Coefficient on $r^{10}$ | 0 |
| Coefficient on $r^{12}$ | 0 |
| Coefficient on $r^{14}$ | 0 |
| Coefficient on $r^{16}$ | 0 |
| Surface STO EVENASPH | |
| Coefficient on $r^2$ | 0.036069468 |
| Coefficient on $r^4$ | −0.0019326477 |
| Coefficient on $r^6$ | 0.010929391 |
| Coefficient on $r^8$ | −0.019845718 |
| Coefficient on $r^{10}$ | 0 |
| Coefficient on $r^{12}$ | 0 |
| Coefficient on $r^{14}$ | 0 |
| Coefficient on $r^{16}$ | 0 |
| Surface 6 EVENASPH | |
| Coefficient on $r^2$ | −0.04959238 |
| Coefficient on $r^4$ | −0.03986785 |
| Coefficient on $r^6$ | −0.040731282 |
| Coefficient on $r^8$ | 0.012511117 |
| Coefficient on $r^{10}$ | 0 |
| Coefficient on $r^{12}$ | 0 |
| Coefficient on $r^{14}$ | 0 |
| Coefficient on $r^{16}$ | 0 |
| Surface 7 EVENASPH | |
| Coefficient on $r^2$ | 0.022642757 |
| Coefficient on $r^4$ | 0.010081191 |
| Coefficient on $r^6$ | 0.013106754 |
| Coefficient on $r^8$ | 0.00031467056 |
| Coefficient on $r^{10}$ | 0 |
| Coefficient on $r^{12}$ | 0 |
| Coefficient on $r^{14}$ | 0 |
| Coefficient on $r^{16}$ | 0 |

Figure 14:
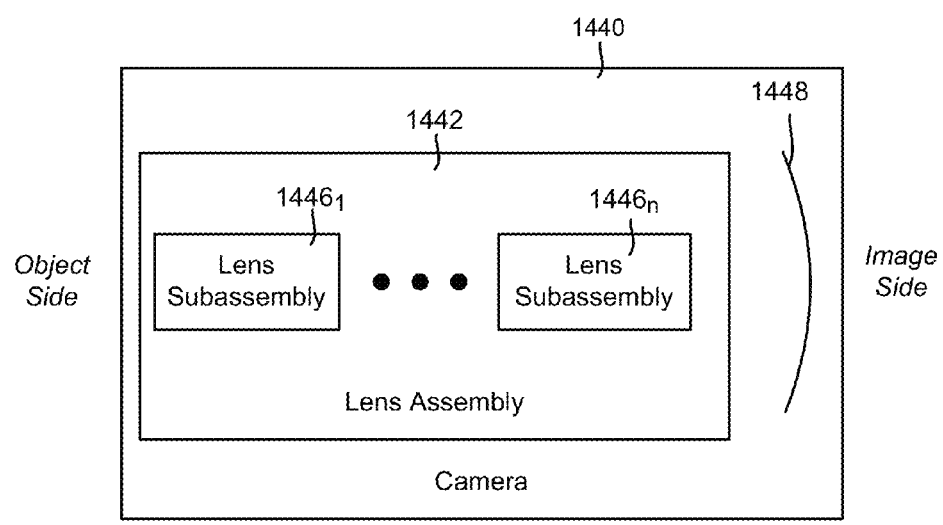
FIG. 14 is block diagram exemplifying a multiple lens assembly incorporated into a camera having a curved sensing surface, according to one or more example implementations

FIG. 14 shows an example of a camera 1440 containing a lens assembly 1442 constructed in accordance with the technology described herein. As can be seen, lens subassemblies 1446₁-1446ₙ focus light, which may be visible light and/or other light (such as infrared) onto a curved surface 1448.

Additional Example Details

In general, some of the exemplified designs are relatively wide-aperture and wide-field and may be constructed using high-order aspheres. Designs may be re-optimized for a lower aperture, and higher-order terms may be dropped. This brings the designs within reach of a description using first-order and third-order wavefront expansions—the domain in which Seidel aberration analysis is appropriate and hence enables the optical function of the various surfaces to be explained.

The lens elements are in general thick in comparison to their separation and therefore a thin-lens solution is not appropriate.

| Seidel aberration | Comment | Correction needed |
|---|---|---|
| $S_I$ | Spherical aberration | Yes |
| $S_{II}$ | Coma | Yes |
| $S_{III}$ | Astigmatism | Yes |
| $S_{IV}$ | Petzval sum (field curvature if $S_{III} = 0$) | No |
| $S_V$ | Distortion | No* |
| $C_I$ | Longitudinal chromatic aberration | Yes |
| $C_{II}$ | Transverse chromatic aberration | Yes |

In these designs, field curvature is effectively left to float and the image sensor is placed at the Petzval surface. Note that distortion correction is desirable in principle, but the effect of correcting distortion is to flatten the image field and hence negate some of the benefits of the curved image field so it is left uncorrected.

Note that even without the aspheres, the system at moderate apertures is well-corrected for the first three primary monochromatic aberrations. The primary offender is astigmatism, and there are only a few wavelengths of this at f/4; by comparison a thin-lens of similar power at the stop would have about 21 wavelengths of astigmatism. Low starting aberrations tend to be helpful to the design.

In one aspect, the design is pseudo-symmetric, which makes coma and transverse color low by default. The design is also generally pseudo-centro-symmetric, which makes coma and astigmatism low at the external surfaces of the lens (the principal ray is roughly normal to the surface).

One or more implementations start with a positive curvature (as with most lenses), as well as having the first element overall positive to help minimize total track. One or more implementations use one aplanatic surface before the stop and/or in which the marginal ray is close to normal at this surface, and make the surface at the stop nearly concentric with the preceding surface. The curvature may be used to control astigmatism as desired.

The buried surface both corrects for longitudinal color and introduces overcorrected (negative) spherical aberration, which helps compensate for that at the external surfaces of the lens.

If an implementation allows aspheres, astigmatism maybe corrected by introducing an asphere into a surface remote from the stop. The effect of the asphere is to introduce a spherical aberration term that, dependent on the ratio of the principal ray height to the marginal ray height will correct some or all of the astigmatism. However, there is likely some coma. Because this was already low, this additional coma is corrected in another surface.

Correcting the residual spherical aberration can be done by an asphere at the stop. One basic approach finds a Gaussian solution that gives low lateral and longitudinal color, ignoring field curvature but using some of the resulting freedom to minimize total track, which is helpful if a solution has low coma and spherical aberration overall so that aspherics do not have to be excessive. Astigmatism may be corrected using a back surface (or the surface furthest from the stop). Coma may be corrected using a front surface (or the surface next furthest from the stop). Remaining spherical aberration may be corrected using the surface at the stop

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A system comprising:
a curved surface; and
a two element lens assembly, the two element lens assembly comprising:
a first aspherical refractive element with positive refractive power having a first object-facing surface and a first image-facing surface;
a second aspherical refractive element comprising a second object-facing surface and a second image-facing surface, the second object-facing surface coupled to the first image-facing surface of the first aspherical refractive element, the second aspherical refractive element configured to focus light onto the curved surface, the second aspherical refractive element comprising a biconvex lens; and
an aspherical buried surface defined by the interface of the second object-facing surface of the second aspherical refractive element and the first image-facing surface of the first aspherical refractive element, the aspherical buried surface configured to introduce negative spherical aberration.

2. The system of claim 1, wherein the first aspherical refractive element comprises a positive meniscus lens.

3. The system of claim 1, wherein the first object-facing surface has a radius of curvature that is greater than a radius of curvature of the first image-facing surface.

4. The system of claim 1, wherein the biconvex lens is physically coupled to the first aspherical refractive element.

5. The system of claim 1, wherein the second object-facing surface has a radius of curvature that is less than a radius of curvature of the second image-facing surface.

6. The system of claim 1, wherein the curved surface comprises a curved sensor.

7. The system of claim 1, wherein the curved surface comprises a hemispherical surface.

8. A lens assembly comprising:

an object-side subassembly having overall positive refraction; and an image-side subassembly optically coupled to the object-side subassembly, the image-side subassembly configured to receive light from the object-side subassembly and focus the received light onto a curved surface, the image-side subassembly comprising:
- a first aspherical refractive element having a first object-facing surface and a first image-facing surface;
- a second aspherical refractive element comprising a second object-facing surface and a second image-facing surface, the second object-facing surface coupled to the first image-facing surface of the first aspherical refractive element; and
- an aspherical buried surface defined by the interface of the second object-facing surface of the second aspherical refractive element and the first image-facing surface of the first aspherical refractive element, the aspherical buried surface configured to introduce negative spherical aberration.

9. The lens assembly of claim 8, wherein the object-side subassembly comprises a positive meniscus lens.

10. The lens assembly of claim 8, wherein the image-side subassembly comprises a biconvex lens and a negative meniscus lens.

11. The lens assembly of claim 10, wherein the object-side subassembly comprises at least two refractive optical elements.

12. The lens assembly of claim 8, having an object-side positive refractive lens, at least two intermediary lenses, and an image side negative refractive lens.

13. The lens assembly of claim 8, wherein the second aspherical refractive element comprises a single biconvex lens.

14. A camera comprising:
a curved surface; and
a lens assembly configured to focus light onto the curved surface, the lens assembly comprising:
- a first lens assembly;
- a second lens assembly optically coupled to the first lens assembly, the second lens assembly configured to receive light from the first lens assembly and focus the received light onto the curved surface, wherein the second lens assembly comprises a biconvex lens, the second lens assembly comprising an aspherical buried surface defined by the interface of a first and second lens, the aspherical buried surface configured to introduce negative spherical aberration.

15. The camera of claim 14, wherein the first lens assembly comprises an aspherical object-side positive refractive lens and the second lens assembly comprises an aspherical image side negative refractive lens.

16. The camera of claim 14, wherein the biconvex lens of the second lens assembly comprises an object-facing side having a radius of curvature that is less than a radius of curvature of a negative image-facing side.

17. The camera of claim 14, wherein the first lens assembly comprises a positive meniscus lens.

18. The camera of claim 14, wherein the second lens assembly is a two element lens assembly, comprising two optically coupled elements.

19. The camera of claim 14, wherein the biconvex lens of the second lens assembly receives light from the first lens assembly, the biconvex lens optically coupled to a negative meniscus lens focuses the light onto the curved surface.

20. The camera of claim 19, wherein the biconvex lens is physically coupled to the negative meniscus lens.

* * * * *